A. G. HERRESHOFF.
CLUTCH.
APPLICATION FILED NOV. 7, 1916.
1,235,896.
Patented Aug. 7, 1917.
2 SHEETS—SHEET 1.
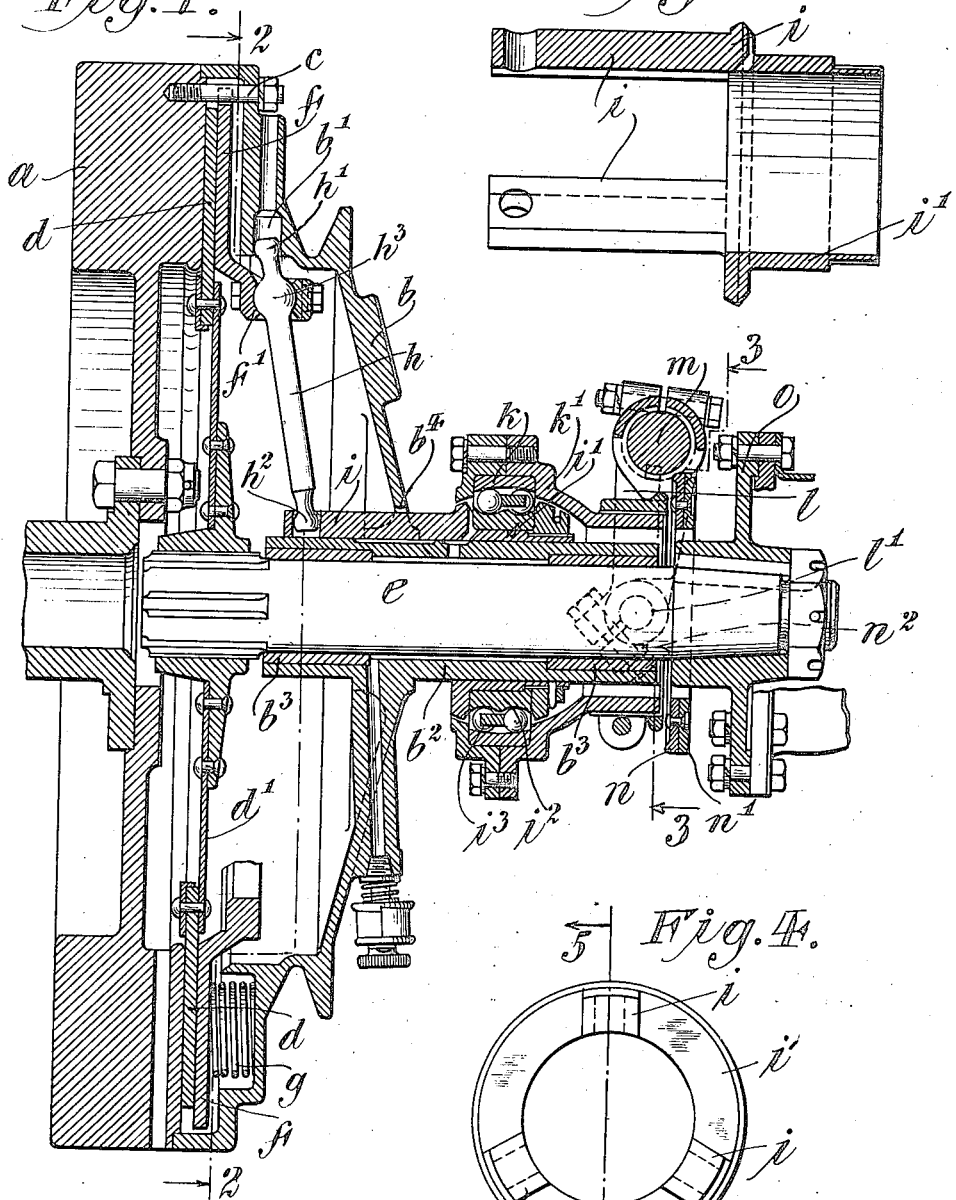
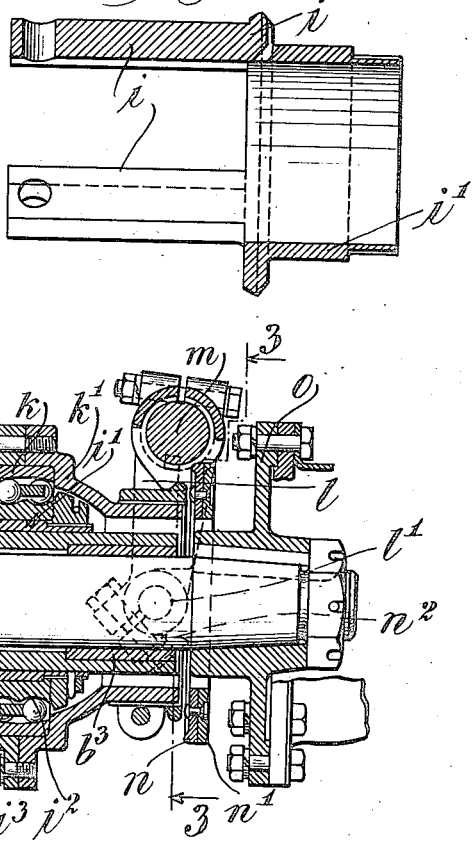
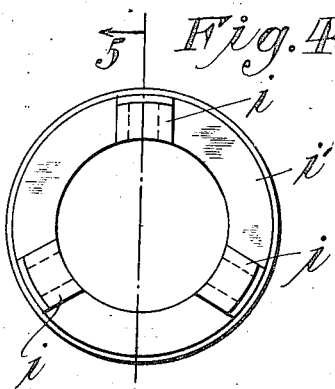

A. G. HERRESHOFF.
CLUTCH.
APPLICATION FILED NOV. 7, 1916.
1,235,896.
Patented Aug. 7, 1917.
2 SHEETS—SHEET 2.
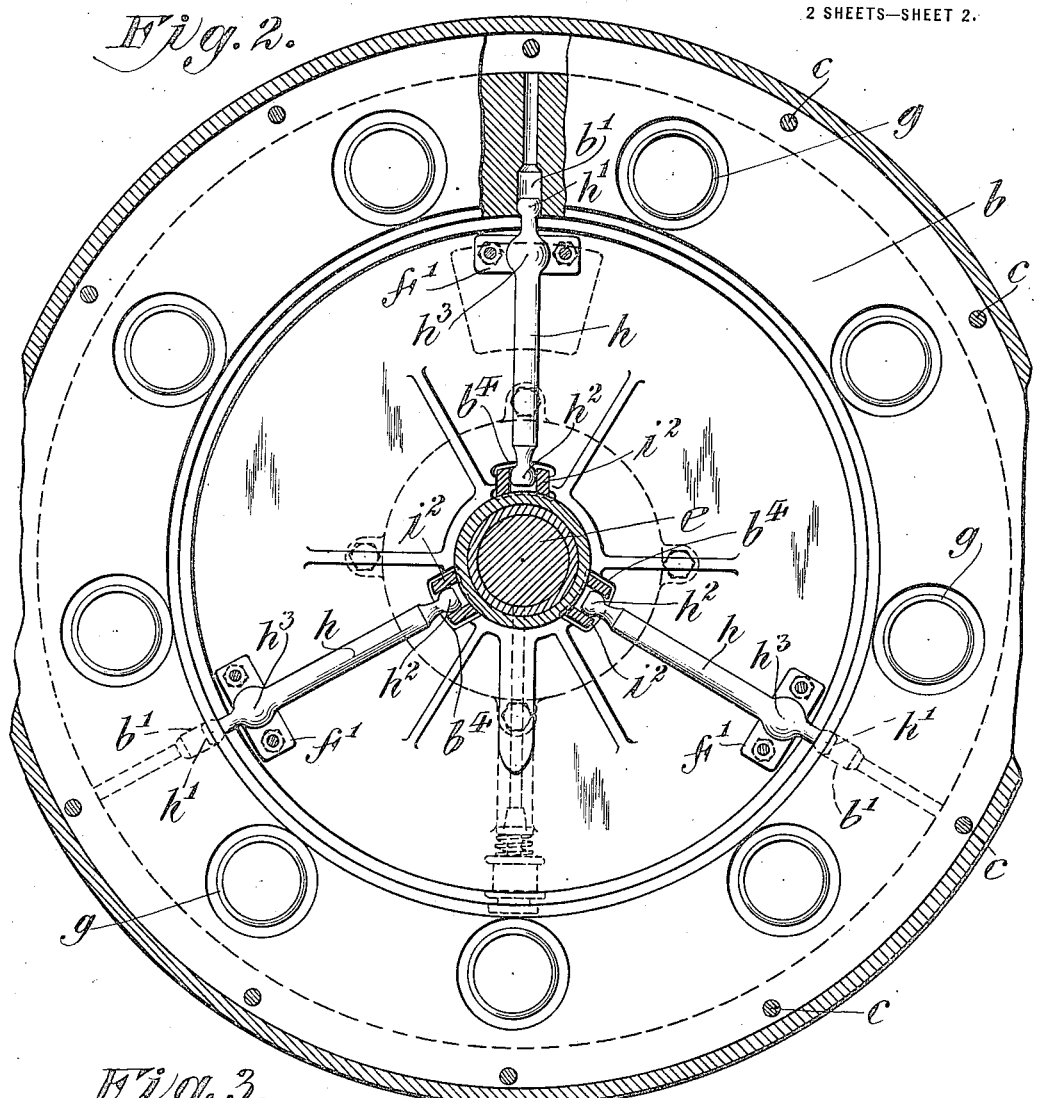
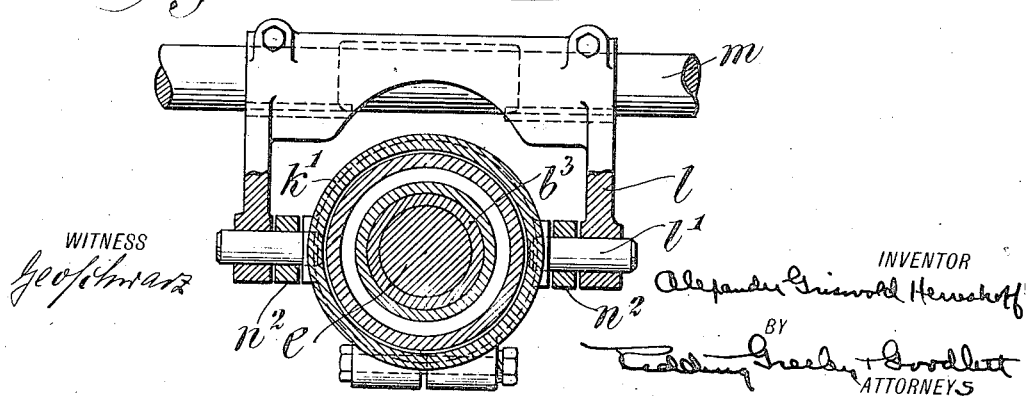

UNITED STATES PATENT OFFICE.

ALEXANDER GRISWOLD HERRESHOFF, OF NEW YORK, N. Y., ASSIGNOR TO INTERNATIONAL MOTOR COMPANY, OF NEW YORK, N. Y., A CORPORATION OF DELAWARE.

CLUTCH.

1,235,896.  Specification of Letters Patent.  Patented Aug. 7, 1917.

Application filed November 7, 1916. Serial No. 129,926.

*To all whom it may concern:*

Be it known that I, ALEXANDER GRISWOLD HERRESHOFF, a citizen of the United States, and a resident of the borough of Manhattan of the city of New York, in the State of New York, have invented certain new and useful Improvements in Clutches, of which the following is a specification, reference being had to the accompanying drawings, forming a part hereof.

This invention relates to clutches of the friction type intended primarily for use in motor vehicles and particularly motor trucks and has for its general object to simplify the construction of such clutches, to render them more compact, increase their efficiency in operation by reducing the friction in the operating devices, and minimize the wear on the moving elements. The invention is further concerned with the improvement of the frictional element by which the power is transmitted. Still a further phase of the invention has to do with the association of an improved brake which is connected operatively to the actuating yoke for the clutch and is intended to be brought into play upon excessive movement of the clutch actuating member. The details of all of these improvements will be described with greater particularity hereinafter in connection with the accompanying drawings in which—

Figure 1 is a view in vertical section through the improved clutch and its associated parts.

Fig. 2 is a view in transverse section taken along the plane indicated by the broken line 2—2 in Fig. 1 and looking in the direction of the arrows one of the recesses being broken away.

Fig. 3 is a detail view of the actuating yoke, the sectional portion being taken along the plane indicated by the broken line 3—3 of Fig. 1 and looking in the direction of the arrows.

Figs. 4 and 5 are detail views of the clutch sleeve, Fig. 5 being a longitudinal sectional view of this sleeve taken along the plane indicated by the line 5—5 of Fig. 4 and looking in the direction of the arrows.

As this description proceeds it will be evident that the clutch with which the invention is concerned is not new in principle nor in many of its structural features, being of the well known frictional type in which the driven member is connected at will to the driving member by bringing frictional surfaces into engagement, as under spring actuation. However, in clutch of this type and others, efforts are being made constantly to improve them in order that they may be more suitable for the rough usage to which they are subjected in motor vehicles and also that manufacturing considerations may be satisfied to the greatest degree possible. It is with these two broad requirements in mind that the present clutch has been constructed. In its main aspects the clutch comprises a rotating member $a$ which may constitute the fly-wheel of the prime mover, a housing $b$ secured to the fly-wheel as by bolts $c$, a friction disk $d$ of leather, fiber or other usual relatively yielding facing material carried on the driven clutch shaft $e$ and a spring-pressed plate $f$ so mounted within the housing $b$ as to press the friction disk $d$ into driving engagement with the fly-wheel $a$ whenever the clutch is in operative condition. The springs $g$ for insuring the frictional driving engagement between the frictional annulus $d$ and the fly-wheel may be disposed around the casing $b$ at equi-distant points in some such relationship as is indicated in Fig. 2. The plate $f$ is retracted from the disk $d$ against the action of the springs $g$, whenever the clutch is released, by a series of levers $h$ which are shown, in the illustrated embodiment, as three in number placed around the plate at equi-distant points. These levers $h$ are formed very much as fingers and have their bearing points of anti-frictional form. As shown in Fig. 1, for instance, the finger $h$ has one end $h'$ of spherical form slidably engaged with a recess $b'$ in the housing $b$ whereby an antifriction fulcrum for the lever is created. The other end $h^2$ of the lever is also of spherical form and is engaged operatively with a sliding finger $i$ hereinafter to be described. Intermediate the ends of the lever $h$ there is formed a spherical bearing section $h^3$ which is engaged with a lug $f'$ formed on the plate $f$, this lug being provided with a socket to afford a suitable bearing seat for the spherical section $h^3$ of the lever. Each of the other three levers $h$ employed are constructed in the identical manner described and are engaged with corresponding parts so that the sliding fingers $i$ will transmit equally to each of the levers $h$ a releasing force for the clutch which is transmitted in turn to the plate $f$, by which the disk $d$ is held in driving engagement with the fly-wheel $a$.

The actuating devices for the parts thus far shown will now be described in greater detail since such actuating devices constitute one of the principal features of the invention. From Fig. 1 it will be evident that the housing $b$ of the clutch terminates in an annular flange $b^2$ which extends rearwardly from the housing and also within the housing for a short distance, this annular flange being provided as a bearing section for other parts to be described. At each end of the annular flange $b^2$ there is provided a bearing $b^3$ for the clutch shaft $e$. Encircling the annular flange $b^2$ and slidably mounted thereon is a clutch actuating sleeve $i'$ on the inner end of which are formed three fingers $i$, each one of which, as has been seen, is engaged operatively with one of the releasing fingers $h$ for the clutch proper. Each one of these fingers extends through a suitable opening $b^4$ formed therefor in the housing $b$. With the sliding sleeve $i'$ is carried a ball race $i^2$ on which run ball bearings $i^3$ for the support of a corresponding outer race $k$ carried with a rearwardly extending sleeve $k'$ or housing for the bearing. The bearing just described is of the self-alining type in which the races are grooved so that axial stresses are met by the balls as well as direct compressive stresses. In this construction, axial movement, for instance, of one of the race members will impart axial movement to the other race member by the lateral pressure of the balls on the races. The end of the housing $k'$ of the bearings is engaged by a clutch yoke $l$ which is carried on a suitable rock shaft $m$ whereby axial movement may be imparted at will to the bearing housing $k'$ as from a foot pedal or equivalent device.

In operation, the frictional annulus $d$ is normally pressed into driving engagement with the fly-wheel $a$ by the plate $f$ under the action of the springs $g$. In this position rotative movement of the fly-wheel $a$ is transmitted through the disk $d$ to the clutch shaft $e$, this shaft at this time being firmly and adequately supported on the two bearings $b^3$ provided therefor in the housing $b$. It is to be noted in this connection that the frictional annulus $d$ being formed as an annulus and supported on a suitable spider $d'$, presents frictional faces to both of the metal surfaces in engagement therewith, to wit, the fly-wheel $a$ and the metallic plate $f$.

Heretofore, it has been the common practice to provide the frictional member with at least one metallic face which, upon being brought into engagement with another metallic face in the operating mechanism, would permit slippage between the two with corresponding wear and heating effect. The difficulties encountered by reason of this heating action of the frictional member are entirely overcome by the improved construction in which the frictional member presents friction surfaces to all of the metal in engagement therewith.

Another feature of note in the improved clutch is the provision of the two bearings $b^3$ for the propeller shaft where, heretofore, it was possible only to provide one bearing in the same space, which the improved clutch occupies. In some cases two bearings for the propeller shaft have been used but this has been achieved at the sacrifice of compactness.

When the clutch is to be released the rock shaft $m$ is moved so as to swing the yoke rearwardly and retract the bearing housing $k'$ with the sleeve $i'$. The fingers $i$ of this sleeve serve to actuate the fingers $h$ in the manner heretofore described and the plate $f$ is thereupon withdrawn from its engagement with the annulus $d$ and the driving engagement between the propeller shaft and the fly-wheel is interrupted. In the movement of the clutch yoke $l$ it will be evident that its pin $l'$ moves in the arc of a circle thereby necessitating a corresponding flexure of the housing $k'$ of the bearings. Heretofore, efforts have been made to compensate for this rocking movement of the retracting element of the clutch disk, but such means as have been devised have either been of complicated and expensive construction or else have not fully compensated for the rocking action and have permitted strains to be thrown on such retracting element. It has been such strains with the multiplied movements due to constant vibration that have impaired the durability of known clutches and have shortened their life unduly. In the illustrated clutch it will be quite evident that the rocking movement of the bearing housing $k'$ is permitted freely since this housing may rock about the balls $i^3$ with a universal action. Such a rocking occurs during the swinging movements of the clutch yoke in both directions. But this rocking action as described is not transmitted to the clutch actuating sleeve $i'$ since this sleeve is maintained in fixed relation to the annular flange $b^2$ of the housing and is thereby insured a truly axial movement in both directions. This condition is the one to be desired under the circumstances described since it permits that degree of flexibility at the required points without the sacrifice of operating effort.

While it is old to associate suitable brakes with clutches adapted to be moved into operative relation with a brake disk upon excess movement of the clutch actuating elements, there has been provided in the improved construction a brake which is of such character as to insure uniform wear on its entire face. Heretofore, such brakes by reason of the stresses flowing from the rocking movement of the clutch elements have been pressed into engagement with the brake disk unevenly with a corresponding wear on the engaged portion. As shown in Fig. 1, the brake $n$ includes a metal annulus encircling the clutch shaft and having secured on its rear face a suitable brake lining $n'$ of approved composition. This brake member is hinged by rearwardly extending arms $n^2$ to the clutch yoke pins $l'$ of the clutch yoke so that actuation of the yoke serves to move the brake rearwardly toward the brake disk $o$ with the face of which the brake lining $n'$ may engage upon excess movement of the clutch yoke. By hinging the brake in the manner described to the pins $l'$ it will be evident that the brake lining upon engagement with the face of the disk $o$ will adjust itself to the face of this disk and be pressed into uniform engagement with it throughout the length of the lining. In this manner uniform wear on the face of the disk is insured.

As indicated hereinbefore, this invention resides in certain improvements to known clutches in the motor vehicle art and these improvements will be recited with some particularity in the appended claims. However, it is to be understood that rearrangements and substitutions of equivalents may be made by those skilled in the art without departing from the spirit of the invention provided the stated advantages are realized in substantially the manner herein taught.

I claim as my invention:

1. A frictional clutch having a frictional member and devices to release said member, including a slidable clutch actuating sleeve, an actuating element therefor moving out of parallelism therewith, and a self-alining bearing interposed operatively between the actuating element and the sleeve.

2. A frictional clutch having a frictional member and devices to release said member, including a slidable clutch actuating sleeve, a swinging yoke for moving the sleeve, and a self-alining bearing interposed operatively between the yoke and the sleeve.

3. A frictional clutch having a frictional member and devices to release said member, including a slidable clutch actuating sleeve, a self-alining bearing having a ball race carried by the sleeve, a housing for the bearing, and a swinging clutch-yoke engaged with the housing.

4. In a frictional clutch, a driving member, a plate, a frictional member interposed therebetween, one of the two first named members being movable to release the clutch, levers having antifriction bearing points connected operatively with the said movable member, a slidable clutch actuating sleeve engaged with the levers, an actuating member for the sleeve moving out of parallelism therewith, and a self-alining bearing interposed operatively between said actuating member and the sleeve.

5. In a frictional clutch, a housing provided with an annular flange extending rearwardly and into the housing, a clutch-shaft passing through the flange, and a plurality of bearings for the shaft carried in the flange.

6. In a frictional clutch, a housing provided with an annular flange extending rearwardly and into the housing, a clutch-shaft passing through the flange, a plurality of bearings for the shaft carried in the flange, and actuating means for the clutch extending through the housing.

7. In a frictional clutch, a housing provided with an annular flange extending rearwardly and into the housing, a clutch-shaft passing through the flange, a plurality of bearings for the shaft carried in the flange, a clutch actuating sleeve slidably mounted on the annular flange and having fingers extending through the housing and engaged operatively with the clutch elements.

8. In combination with a clutch, a swinging, actuating arm therefor, and a brake member carried by said arm and hinged thereto, and operable after release of the clutch.

9. In combination with a frictional clutch, an actuating yoke therefor, an annular brake member hinged to the clutch-yoke, and a brake-disk with which the brake may be engaged after release of the clutch.

This specification signed this 31st day of October, A. D. 1916.

ALEXANDER GRISWOLD HERRESHOFF.